March 6, 1956 K. KOLKS 2,737,481
REGENERATIVE OVEN REVERSING AND VENTING APPARATUS
Filed Sept. 28, 1949 2 Sheets-Sheet 1

Inventor:
Karl Kolks

United States Patent Office 2,737,481
Patented Mar. 6, 1956

2,737,481

REGENERATIVE OVEN REVERSING AND VENTING APPARATUS

Karl Kolks, Essen-Ruhr, Rellinghausen, Germany, assignor, by mesne assignments, to Koppers Company, Inc., Pittsburgh, Pa., a corporation of Delaware Application September 28, 1949, Serial No. 118,343

4 Claims. (Cl. 202—151)

The invention relates to horizontal chamber or retort ovens for the production of gas and coke, and batteries of such ovens, and in particular to regenerative coke ovens or the like which are fired with gas, as for instance with producer gas, which has to be preheated in regenerators in order to attain the desired combustion temperature within the heating flues of the oven.

The essential object of the invention is to provide improvements which facilitate the firing of the regenerative coke ovens with lean gas and permit without trouble the preheating of the lean gas in the regenerators.

In the well-known regenerative system of coke oven batteries and other industrial furnaces, two heat reservoirs, known as regenerators, are provided which alternatively serve during one period of operation to preheat the fuel gas and during the next period of operation will be heated up by the hot waste gases. As soon as the regenerator used to preheat the fuel gas has cooled down so far, that the fuel gas is no longer preheated to the desired temperature, the flow direction of the heating media is changed. Fuel gas is then supplied to the regenerator to which flowed previously the hot waste gases and to the other side hot waste gases are supplied to the regenerator which in the preceeding period of operation was used to preheat the cold fuel gas.

During the reversal of the flow direction of the heating media within the regenerative system, a certain order must be observed to prevent explosions. If, while reversing the flow direction, the flow of the cold fuel gas, of the air and of the hot waste gases would be changed simultaneously or successively one after the other, a certain quantity of fuel gas would remain in the gas regenerator and come into contact with the hot inflowing waste gas.

Since the waste gases as a rule still contain considerable quantities of oxygen, explosions may occur at the moment the hot waste gases enter into the regenerator filled with fuel gas.

In order to prevent such explosions, the reversal of the flow direction of a regenerative system is performed in such a manner that the supply of the cold fuel gas is first stopped. After a certain interval during which the fuel gas still present within the regenerators may burn out, the devices for the reversal of the flow direction of the combustion air and the waste gases are put into operation. Only after this has been done is the fuel gas valve which leads to the other regenerator finally opened.

During this purge operation all fuel gas valves or other blocking devices therefor are closed for a certain period of time. This complete cut-off of the fuel gas flow leads, however, to considerable disadvantages. In many cases the supply of the fuel gas cannot be reduced or stopped at all. This, for instance, is the case where regenerative coke ovens are fired with top gas from blast furnaces. In such and similar cases, heretofore an additional special gas holder which stored the fuel gas during the reversing period of the regenerative system had to be provided for.

The present invention avoids these and other disadvantages essentially in that a cock or other suitable means are provided in the fuel gas supply line of the coke oven battery so as to control a branch line leading to the atmosphere and which are operated by the usual reversing machine of the regenerative system in such a manner that on cutting off the gas supply from the supply line to the regenerators the fuel gas supply line is opened simultaneously to the atmosphere.

According to another feature of the invention the means arranged in the fuel gas supply line and controlling a branch line thereof leading to the atmosphere is equipped with two individual controls to be operated and act independently of each other, which close and open, respectively, the said branch line alternatively. According to this feature of the invention such controlling means may be formed by several rotary slide valves which are arranged co-axially in the casing.

To operate the rotary slide valves hollow shafts or the like are used in the known manner which pass through openings in the casing of the controlling means in a gastight manner.

Further important objects and features of the invention will be obvious to those skilled in the art from the following specification and claims. Reference will now be made to the accompanying drawing which illustrates and exemplifies the embodiment of the invention in a preferred type of construction.

Figure 1:
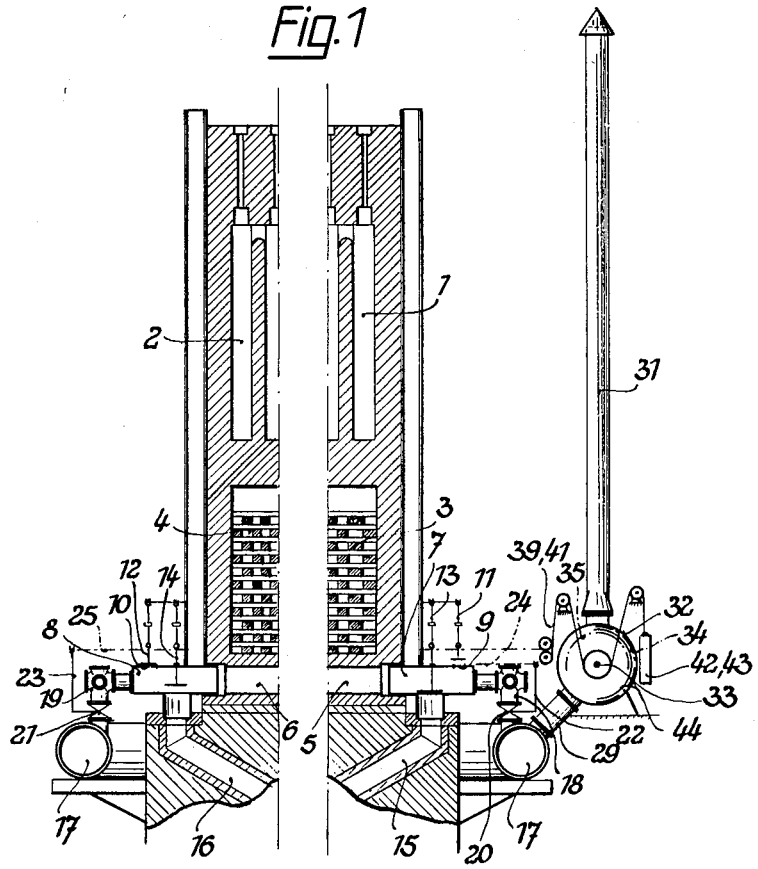
Figure 1 shows a vertical section through one part of a regenerative coke oven battery according to the invention.

The construction of the coke evens to which the invention is applicable may be of any optional type. In the construction of the coke ovens, which consist of refractory brickwork, coking chambers and heating walls are placed side by side alternatively and heating flues 1, 2 are provided in said heating walls in the usual manner. Below the level of the heating walls and of the coking chambers regenerators 3, 4 are arranged which are operated in pairs in such a manner that each one regenerator 3 is in connection through the heating flues to one regenerator 4, whereby the regenerators of each pair are separated from each other by gas-tight partitions. From the regenerators 3, 4 channels, not shown however in the drawing, lead to the flues of the heating wall located thereabove, for instance the regenerator 3 stands in connection with the oddnumbered alternative heating flues 1, 3, 5, etc. and the regenerators 4 with the even numbered heating flues of the heating walls. The flues, in this instance, are connected pairwise at their upper end so as to form so-called hairpin flues.

As generally known, the operation of the regenerative system is such that for instance fuel gas is introduced into the regenerators 3 which previously have been highly heated and is preheated on the hot surfaces of the regenerator chequer work. The fuel gas heated in the regenerator 3 flows then through suitable connections into the oddnumbered heating flues 1, 3, 5, etc. Into these oddnumbered heating flues hot air is supplied simultaneously, such air being preheated in regenerators similar to regenerators 3, but arranged adjacent to the latter in the row of regenerators on each side of the battery, as usual in coke oven practice.

Fuel gas and air is burned in the odd numbered heating flues, and the hot waste gases pass then into the even numbered heating flues 2, 4, 6, etc., which are in connection at their taps with the tops of the odd numbered heating flues in such a manner that hairpin flues are formed, through one half of which the gases flow upwards and through the other half of which the gases flow downwards. The hot combustion gases then pass from the odd numbered heating flues into the regenerator 4 and there give off their sensible heat to the desired extent to the chequer work of the regenerator. As soon as the regenerators 3 have cooled down, the flow direction of the heating media is reversed. This means that fuel gas or air respectively is introduced into the regenerators 4 and the other regenerators on the corresponding side of the battery, and that the combustion takes place now in the even numbered heating flues and that the regenerators 3 etc. are re-heated by the hot waste gases.

In a similar way as described above for coke ovens according to Figure 1, all regenerative systems are operated.

Figure 4:
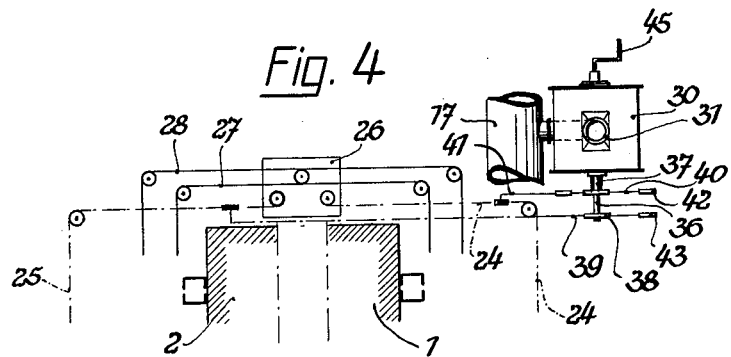
Figure 4 shows diagrammatically the reversing means of the regenerative system according to the invention, arranged at the end of a coke oven battery.
Figure 5:
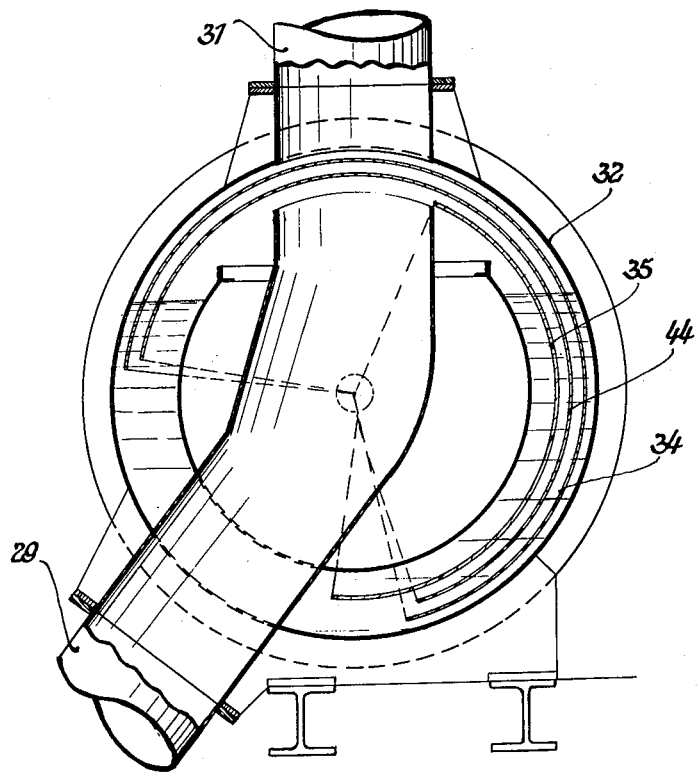
Figure 5 shows in enlarged scale a top view of the controlling means for the blow-off pipe of the fuel gas line.

The regenerators 3 and 4 are in connection with sole flues 5 and 6 respectively which on their outer end are connected individually to the so-called knee pieces or regenerator flow reversal boxes. Two sole flues 5 and 6 respectively are provided for the regenerators 3, 4 and thus to one knee piece each, only two knee pieces 7, 8 however being illustrated in the drawing. The knee pieces 7, 8 shown are used to connect the sole flue 5, 6 in alternation with the waste gas flues 15, 16, and with the atmosphere in order to supply combustion air to the system. The adjacent knee pieces lying behind the knee pieces 7, 8 are in connection with the fuel gas main 17 through branches 18, 19 and are arranged in such a manner that they are in alternation connected to a waste heat flue or to the fuel gas main 17. For this purpose change-over valves 20 and 21 respectively which might be operated by the levers 22, 23 which are shown diagrammatically are provided in the branch lines 18, 19. The levers 22 of all valves controlling said branches on one side of the battery are connected to the wire cable 24 and the levers 23 of the knee pieces at the other side of the coke oven battery to the wire cable 25. Both wire cables 24, 25 are connected to the usual reversing machine 26, which is arranged on the front side of the oven battery and shown diagrammatically in Figure 4. To the reversing machine 26 further wire cables 27, 28 are connected which are used to operate the reversing air valve or dampers 11, 12 of the knee pieces 7, 8 and the waste heat dampers 13, 14 of the knee pieces 7, 8, and the waste heat dampers of the adjacent fuel gas knee pieces not shown in the drawing.

The regenerator fuel gas main 17 is in connection through a branch 29 controlled by the apparatus 30 with a blow-off line 31 which opens into the atmosphere. The apparatus 30 comprises a casing 32 in which are arranged the rotary slide valves 34, 35 and 44, all rotatable around the axis 33. The interior of the casing 32 is filled with a suitable sealing liquid, as for instance water, to the outlined level. The branch 29 opens into the casing at a position above the level of the sealing liquid. The rotary slide valves 34, 35, 44 are constructed in such a manner that they may, individually or in any desired combination, be moved across the opening of the branch line 29, and then dip with their edge so far into the sealing liquid that the connection between the branch line 29 and the blow-off line 31 is completely cut off.

To operate the rotary slide valve 34 the shaft 36 is used and to operate the slide valve 35 a hollow shaft 37 arranged co-axially to shaft 36. On the shaft 36 a wheel 38 is provided over which the wire cable 39 runs. The wire cable 39 is connected with the wire cable 25 at one side of the battery. On the hollow shaft 37 is affixed the wheel 40 over which the wire cable 41 runs which is connected to the wire cable 24 serving the other side of the battery. At the ends of the wire cables 39, 41 counterweights 42 and 43 respectively are fastened which keep the wire cables tightened.

It may be assumed that the odd nulbered heating flues 1, 3, 5, etc. of the oven battery are being heated. This condition of the regenerative system is represented in Figure 1. During this period of operation the even numbered heating flue 2 is in connection with the waste heat flues. In the knee pieces 8, therefore, the air valves 12 are closed, the waste heat valves 14 being opened. With regard to the adjacent regenerators the connection of the knee pieces to the fuel gas flues 17 is then cut off and the correspondent waste gas flues are opened.

On the right side of the battery the regenerator fuel gas valves 20 and the air valves 13 are open so that air and fuel gas may enter into the knee pieces 7 by the opening 9 and valve 20. Air and fuel gas may now enter into the regenerators symbolically represented as along the right side of the battery in the drawing. The blow-off pipe 31 is closed during this period of operation as shown in Figure 1 by the rotary slide valve 35.

Figure 2:
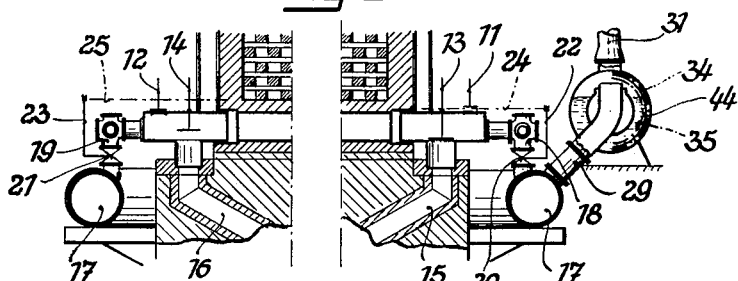
Figure 2 shows one part of Figure 1 at another moment of the regenerative operation.

In order to reverse, the heating direction is reversed in the following way:

By means of the reversing machine 26 and through the wire cable 24 the fuel gas cocks 20 on the right hand side are closed first. Since the wire cable 24 by means of wire cable 41 and the wheel 40 is in connection with the rotary slide valve 35, the slide valve simultaneously is put into the opened position indicated in Figure 2. Therefore, the branch 29 is connected with the blow-off pipe 31 and the regenerator fuel gas may escape to the atmosphere from the main 17 without an undue back-pressure being created in the main 17, due to the conventional use of a blower or exhauster continuing to force the fuel gas into the main 17.

Figure 3:
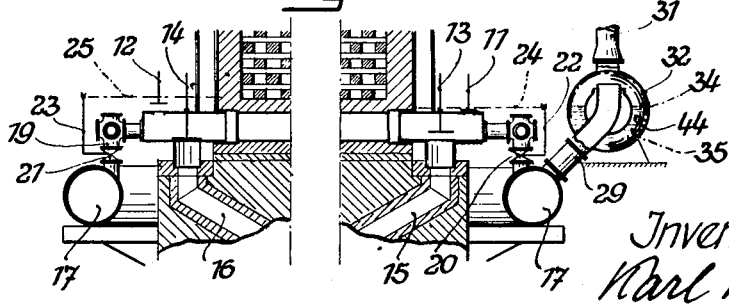
Figure 3 shows a similar section of Figure 2 with another setting of the controlling means of the regenerative system.

As soon as the fuel gas remaining in the regenerators 3 has been burned, the wire cables 27, 28 are put into operation by the reversing machine 26. In this way the knee pieces on the left side of the batteries are reversed so that the waste heat flues are then closed by valve 14 and the air valve 12 opened, whereas on the right hand side the waste heat valve 13 is opened and the air valve 11 is closed, as evident from Figure 3. As soon as this has been done the reversing machine 26 puts the wire cable 25 into motion, by which operation the gas cocks 21 on the left side of the battery are opened. Simultaneously by the operation of the wire cable 25 the rotary slide valve 34 of the apparatus 30 is brought into closed position by wire cable 39, as indicated in Figure 3. Thereby the connection of the regenerator fuel gas main 17 with the atmosphere is again cut off so that the regenerator fuel gas may flow through the open valves 21 with the desired pressure into the gas regenerators at the left side of the oven battery.

On a further reversal of the heating direction, the reversing operation is performed in accordance with the above. Thus, the regenerator fuel gas cocks are closed in any case at first, and simultaneously therewith the blow-off pipe 31 is opened, until the regenerator fuel gas valves of the knee pieces are opened at the other side of the battery and fuel gas is again withdrawn from the main 17 into the regenerators.

In the controlling means 30 another, third rotary slide valve 44 may be provided which is operated manually by a crank 45 in case, any emergency should necessitate the cutting off of the regenerator fuel gas line 17 from the blow-off line 31.

Although the invention has been described in detail hereinbefore for horizontal or retort oven batteries it is quite evident that the invention is applicable advantageously also to other regenerative systems.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. Regenerative coke oven battery or other regenerative system adapted to use lean gas as a fuel, comprising a reversal mechanism for reversal in preheating of the gas by contact with the hot surface of the chequer work of the regenerators, a regenerator fuel gas main connected by branches with the individual regenerators, reversing valve means controlling said branches, said reversal mechanism being operated mechanically by a reversing machine and being connected with said reversing valve means, a special gas outlet branch connected with said regenerator fuel gas main and opening to the atmosphere, controlled means for said special branch for opening and closing the same to the atmosphere, and means mechanically operated from said reversing machine for operating the controlled means for the special branch in such manner that the regenerator fuel gas main is connected to the atmosphere as soon as and while all branches leading from the regenerator fuel gas main to the individual regenerators are closed by their reversing valve means during the period of reversal of the flow direction of the heating media by the reversing machine, means for operating the controlled means for the special branch is connected with the reversal mechanism so that the controlled means after being operated to connect the regenerator fuel gas main with the atmosphere during the reversal of the flow direction of the heating media, is operated to close the regenerator fuel gas main again against the atmosphere as soon as the regenerator fuel gas main is opened again to the regenerator branches by the reversal mechanism.

2. Regenerative coke oven battery or other regenerative system adapted to use lean gas as a fuel, comprising a reversal mechanism for reversal in preheating of the gas by contact with the hot surface of the chequer work of the regenerators, a fuel gas main connected with branches for the individual regenerators, reversing valve means controlling said branches, said reversal mechanism being operated mechanically by a reversing machine and being connected with said reversing valve means, a special gas outlet branch connected with said fuel gas main and opening to the atmosphere, controlled means for said special branch for opening and closing the same to the atmosphere, and means mechanically operated from said reversing machine for operating the controlled means for the special branch in such manner that the fuel gas main is connected to the atmosphere as soon as and while all branches leading from the fuel gas main to the individual regenerators are closed by their reversing valve means during the period of reversal of the flow direction of the heating media by the reversing machine, and in which the controlled means for control of the special branch leading from the fuel gas main to the atmosphere comprises a casing containing a liquid seal, rotary slide valves arranged in said casing for movement into and out of sealing relation with the sealing liquid, to seal and unseal the special branch from and to the atmosphere, said rotary slide valves being connected to the reversal mechanism of the coke oven battery for movement into and out of sealing relation by the opening and closing movements for the fuel branch reversal valve means of the reversal mechanism.

3. Apparatus as claimed in claim 2, and in which the rotary slide valves comprise two valves arranged coaxially of each other and operated independently of each other, said valves being connected to the reversal mechanism in such manner, that in the operation of the reversal mechanism for effecting flow in one direction of the heating media, one of said valves is kept open and the other one is closed, and upon operation of the reversal mechanism for effecting flow in the other direction, the other valve is kept open and the first one is closed.

4. Apparatus as claimed in claim 3, and in which a third rotary valve slide is also provided in the casing, and means suitable for operating the same manually from outside the casing is provided for emergency operation of the third valve independently of the other two valves and of the reversal mechanism.

References Cited in the file of this patent
UNITED STATES PATENTS

| | | |
|---|---|---|
| 424,761 | Conroy | Apr. 1, 1890 |
| 738,236 | Prentice et al. | Sept. 8, 1903 |
| 1,246,114 | Koppers | Nov. 13, 1917 |
| 1,597,365 | Keigley et al. | Aug. 24, 1926 |
| 1,635,679 | Kus | July 12, 1927 |
| 2,193,697 | Roberts | Mar. 12, 1940 |
| 2,554,818 | Davis | May 29, 1951 |

FOREIGN PATENTS

| | | |
|---|---|---|
| 24,809 of 1930 | Australia | Aug. 12, 1930 |